Jan. 28, 1969 C. I. COWAN 3,425,054

ANALOGUE DIGITAL CONVERTERS

Filed Feb. 15, 1965 Sheet 1 of 2

United States Patent Office 3,425,054

Patented Jan. 28, 1969

3,425,054

ANALOGUE DIGITAL CONVERTERS

Claude Isaac Cowan, Elstree, England, assignor to Elliott Brothers (London) Limited, London, England, a company of Great Britain Filed Feb. 15, 1965, Ser. No. 432,715
U.S. Cl. 390—347 5 Claims
Int. Cl. H03k 13/17; H04l 3/00

ABSTRACT OF THE DISCLOSURE

An analogue-digital computer has a number of stages each representing a plurality of digits in a numerical system, the stages being connected in series in decreasing order of significance. Separate subtracting devices are connected between each two successive stages. Reference voltages are supplied to each stage representing the digits in the system and their order of significance. An input voltage applied to each stage is compared with the set of reference voltages applied to that stage to give an output signal indicating that one of the set of reference voltages applied to the stage which is greater than such input voltage. A digitizing device assumes a condition representing in digital form such greater reference voltage. The input voltage to each stage is applied to the subtracting device between such stage and the following stage, to derive voltage representing the difference between such input voltage and such greater reference voltage. The voltage to be digitized is applied to the first stage as the input voltage therefor and the difference voltage for each stage is applied as the input voltage to the next stage.

This invention relates to improvements in analogue-digital converters.

Analogue-digital converters as hitherto proposed generally operate by the comparison of an analogue current signal, derived from the analogue voltage to be digitised through a resistor, with reference analogue currents derived from a reference voltage through a multiplicity of resistors which are switched to build up the reference current to that of the analogue current to be digitised. For great accuracy to be achieved, the resistors employed have to be highly accurate and of a type suitable for high speed operation since switching of the resistors involves transients which have to be allowed to settle before an accurate reading can be taken. Such resistors are not generally available at this time.

It is an object of the present invention to provide an improved high speed precision analogue-digital converter which shall not be subject to the disadvantages referred to above.

It is a further object of the present invention to provide an improved high speed precision analogue-digital converter which shall be capable of sampling and digitising analogue voltage signals at intervals of the order of 1$\mu$ sec.

According to the present invention there is provided an analogue-digital converter comprising at least one stage having means operable to compare an input voltage simultaneously with a plurality of reference voltages of magnitudes increasing in similar steps and to produce an output signal representing that one reference voltage which is not greater than the input voltage and is one step below a reference voltage which is greater than the input voltage and means responsive to said output signal to assume a condition representing in digital form said one reference voltage.

Preferably a second stage is provided similar to said one stage and is connected to said one stage through a subtractor device operable to subtract said one reference voltage from said input voltage and apply the difference voltage as an input voltage to said second stage, the reference voltages of said second stage being less than the reference voltages of said one stage by a common factor.

Conveniently, each stage compares the input voltage thereto with nine reference voltages and the common factor is 10.

Figure 1:
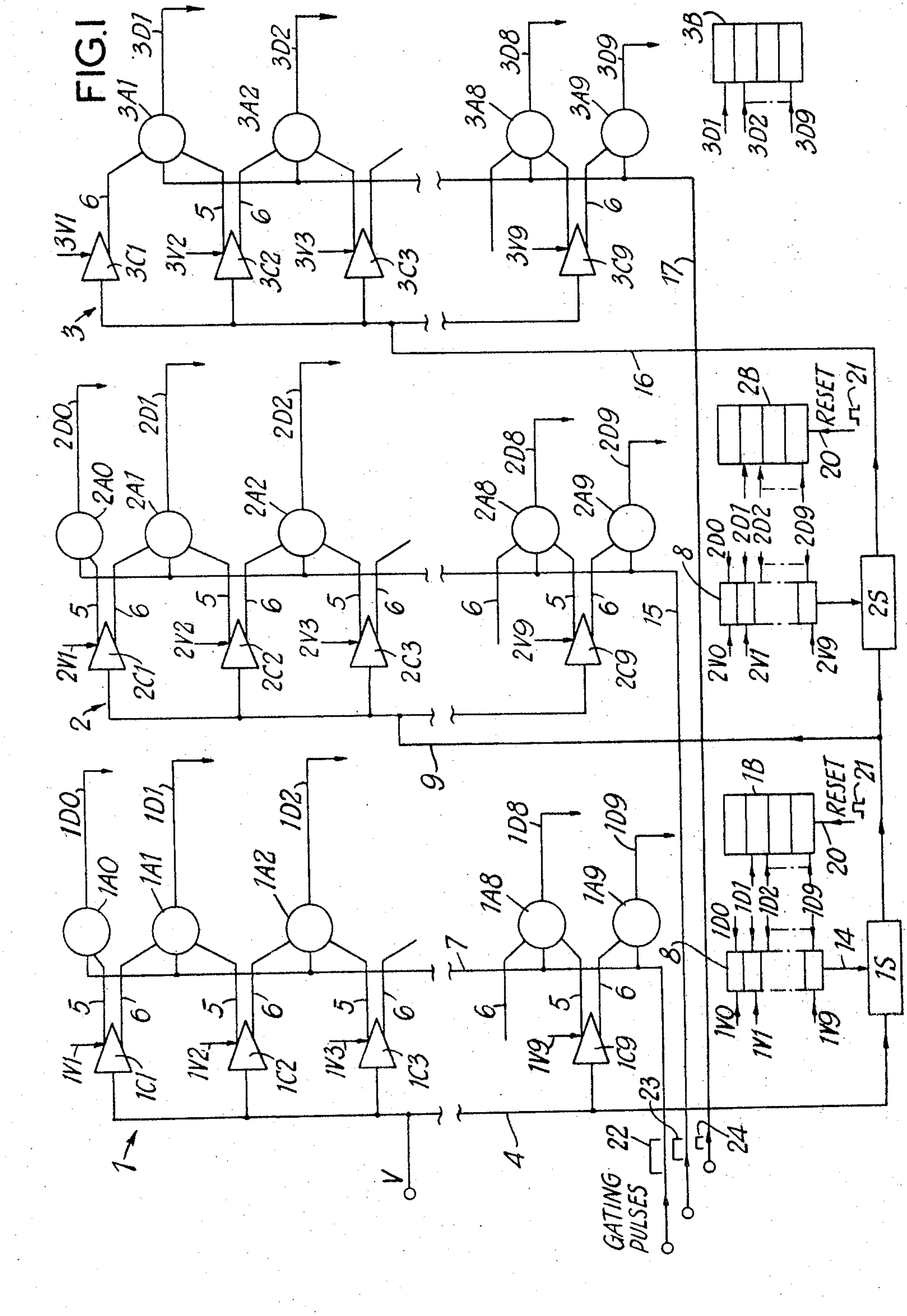
Figure 2:
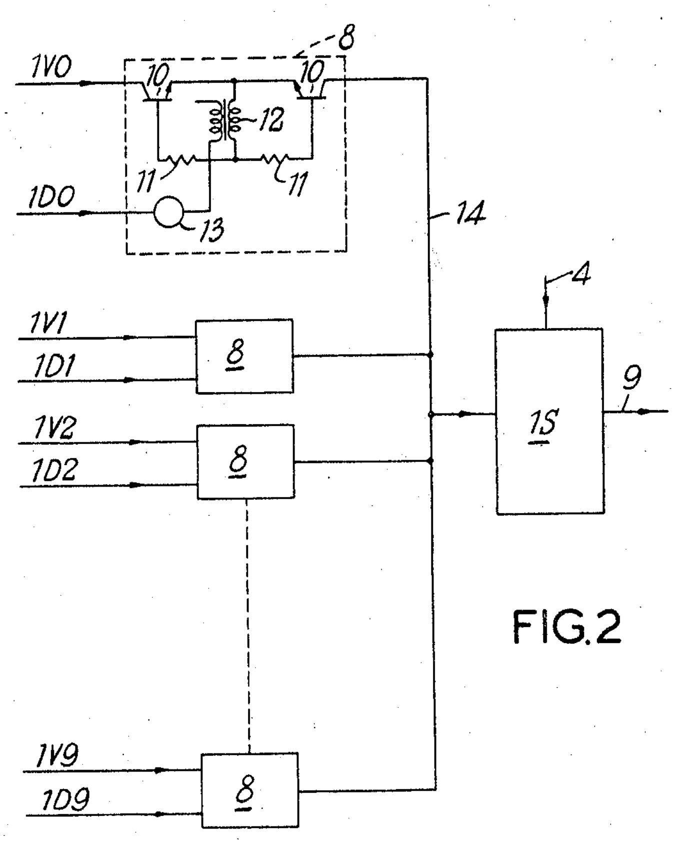
Figure 3:
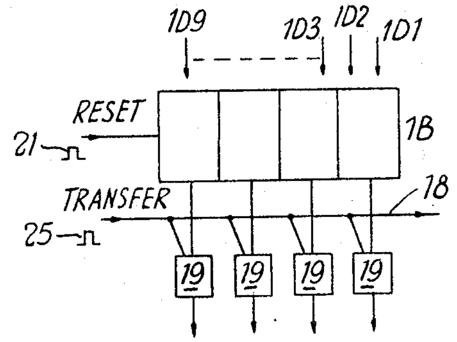
Figure 4:
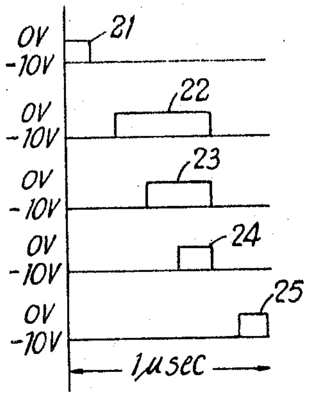

One embodiment of the invention will now be described by way of example, reference being made to the accompanying drawings in which:

FIG. 1 is a block schematic diagram of an analogue-digital converter according to the invention, FIG. 2 illustrates a detail of FIG. 1, FIG. 3 is a block diagram illustrating means for reading the binary number derived from the converter of FIG. 1, and FIG. 4 illustrates a cycle of pulses applied to the converter of FIG. 1.

The analogue-digital converter of this example comprises three stages 1, 2 and 3 arranged in order of significance. Each stage comprises nine comparator amplifiers, those of the first stage being identified as 1C1, 1C2 . . . 1C9, those of the second stage as 2C1, 2C2 . . . 2C9, and those of the third stage as 3C1, 3C2 . . . 3C9. The input voltage to be digitised is applied to the amplifiers 1C1 . . . 1C9 along a common input line 4. A separate reference voltage is applied to the amplifiers 1C1 . . . 1C9 along respective input line 1V1 . . . 1V9. The reference voltages applied to the amplifiers 1C1 to 1C9 increase in similar steps to span a range of voltage covering the maximum input voltage capable of being digitised. Assuming the input voltage to lie in the range of 0–10 v., the reference voltage along line 1V1 would be 1 volt, along line 1V2 two volts and along line IV9 nine volts. Each amplifier 1C1 . . . 1C9 is operable to compare the input voltage with the applied reference voltage and produce two output signals of different levels along lines 5 and 6 respectively. When the input voltage is not greater than the applied reference voltage the output signal along line 5 is at one level and that along line 6 is at the other level and the output signal along line 5 is at the other level and that along line 6 is at the one level. Thus the levels of the output signals along lines 5 and 6 is effectively switched or interchanged when the input voltage along line 4 changes from being not greater than the applied reference voltage to being greater than the applied reference voltage. One of the levels of output signal along lines 5 and 6 can be zero volts.

A separate three input AND gate is connected to the outputs of each adjacent pair of amplifiers 1C1 to 1C9. There are therefore eight such AND gates in the first stage arranged with one input connected to the output line 6 of one amplifier, the second input connected to the output line 5 of the adjacent amplifier and a third input connected to a common gating line 7. As shown, each AND gate has one input connected to an output line 5, the second input connected to an output line 6 and the third input connected to the common gating line 7. These three-input AND gates are identified as 1A1, 1A2 . . . 1A8. Two two-input AND gates identified as 1A0 and 1A9 are provided, the gate 1A0 having its two input respectively connected to the output line 5 of comparator amplifier 1C1 and the common line 7 and the gate 1A9 having its two inputs connected to the output line 6 of the comparator amplifier 1C9 and the line 7 respectively. The outputs from the gates 1A0 to 1A9 respectively appear along lines 1D0 to 1D9.

The lines 1D1 to 1D9 are connected to a four-stage bistable device 1B in such a way that an output signal along any one of the lines will set up the corresponding binary number in the device 1B. Thus, an output along line 1D1 will set up in the device 1B the corresponding binary number 0001 and an output along line 1D9 will set up the corresponding binary number 1001.

The operation of the circuit thus far described is as follows: The input voltage to line 4 must lie somewhere within the range of reference voltages applied to the comparator amplifiers 1C1 to 1C9 so that somewhere in the series the output signals from these amplifiers along lines 5 and 6 must change from one level to the other. Assume, for example, that the input voltage is 2.12 volts. Then the outputs from comparator amplifiers 1C1 and 1C2 along lines 5 will be at one level and along lines 6 at the other level as the applied reference voltages are lower than the input voltage. The outputs from amplifiers 1C3 . . . 1C9 along lines 5 will be at the other level and along lines 6 at the one level as the applied reference voltages will be greater. Thus only AND gate 1A2 will have the same level of output signal along lines 5 and 6 applied thereto and under these conditions that gate is enabled. The other AND gates are not enabled as the two inputs thereto are different. A gating pulse is applied to the common gating line 7 and is passed by the enabled gate 1A2 to produce a corresponding pulse at the output line 1D2. This is applied to the bistable device 1B to set up the corresponding binary number 0010. Thus the bistable device 1B is set up in binary form to the most significant digit of the input voltage namely to give the value of two.

It will be appreciated that the AND gate 1A0 is enabled when the input voltage is less than 1 volt to pass the gating pulse, and the AND gate 1A9 is enabled when the input voltage is greater than 9 volts. The output line 1D0 is not connected to bistable device 1B as the latter is automatically reset to zero after every reading. The output line 1D9, is, however, connected to the bistable device 1B.

A subtractor device 1S is associated with the stage 1 and a similar device 2S is associated with the stage 2. Such devices may take any suitable form as may be understood and may be an adder device preceded by an inverter stage. The reference voltages applied along lines 1V1 . . . 1V9 are also applied to the substractor through separate switches 8 (FIGS. 1 and 2). The input voltage along line 4 is also applied to the subtractor device 1S. The switches 8 are arranged to be closed or to assume the highly conducting condition when a signal appears along the corresponding output line 1D1 to 1D9. Thus, in the above example, the output pulse along line 1D2 causes the reference voltage of 2 volts from line 1V2 to be applied to the substractor device 1S where it is subtracted from the input voltage along line 4 to produce an output signal along line 9 representing the balance of 0.12 volt.

An additional switch 8 is associated with the line 1D0 to apply along line 1V0 a reference voltage of 0 volt to the subtractor device 1S when the input signal is less than 1 volt to prevent stray capacitances in the circuitry causing the subtractor device 1S to see a reference voltage other than 0 volt. Each switch 8 may conveniently take the form shown in FIG. 2 and comprise a pair of transistors 10 with their emitters connected together, their bases connected through two series resistors 11 and the secondary winding of a transformer 12 connected between their emitters and the junction of the resistors 11. The primary of the transformer 12 is connected through a drive unit 13 to the corresponding line 1D0 to 1D9. The collector of one of the transistors 10 is connected to the corresponding reference voltage line 1V0 to 1V9 and the collector of the other transistor 10 is connected through an output line 14 common to all the switches 8 to the subtractor device 1S. Thus a signal along the appropriate line 1D0 to 1D9 operates the associated drive unit 13 to bottom the associated transistors 10 and apply the corresponding reference voltage along the associated line 1V0 to 1V9 to the subtractor device 1S.

The output signal along lines 9 is applied to the second stage 2 which is similar in all respects to the first stage and similar references are used to denote similar parts with the prefix changed from 1 to 2. The common gating line 7 of the first stage is not connected to the second stage but the latter has a separate common gating line 15. Also the reference voltages of the second stage are scaled down by a factor of 10. Thus, in the second stage, the AND gate 2A1 will be enabled and a pulse along line 15 will produce a corresponding output along line 2D1 which will set up the bistable device 2B to a number in binary form corresponding to 0.1 and to apply a reference voltage of 0.1 volt to the subtractor device 2S. The latter operates to subtract this reference voltages from the voltage of 0.12 volt appearing along line 9 to give an output representing 0.02 volt along line 16 which is applied as the input voltage to the third stage 3. The third stage 3 is similar to the preceding stage in most respects and similar references are used to denote like parts with the prefix changed from 2 to 3. As this is the last stage in this example, no two-input AND gate corresponding to the gates 1A0 and 2A0 of the previous stages is required and no subtractor device is necessary. The reference voltages applied to this stage are scaled down by a factor of 10 with respect to the preceding stage. A separate common gating line 17 is provided common to the AND gates 3A1 to 3A9. In this case, the input voltage along line 16 causes the gate 3A2 to be enabled to pass the pulse applied along the gating line 17 to the line 3D2 which sets up the bistable device 3B to a number in binary form representing the value 0.02. Thus the input voltage to line 4 has now been digitised to binary form and the corresponding number appears in the devices 1B, 2B and 3B. Once this number has been obtained, it may be read out in any convenient way. One way of doing this is shown in FIG. 3 in which the binary numbers are read out in parallel form by a transfer pulse applied along line 18 which opens gates 19 to the bistable devices 1B, 2B and 3B and allows the condition of these devices to be read. Each bistable device also has a reset facility and is reset by a reset pulse applied along line 20.

The sequence of pulses is shown in FIG. 4. First a reset pulse 21 is applied to return all the bistable devices to zero. Then a gating pulse 22 is applied along gating line 7 to the first stage. During the pendenecy of the gating pulse 22 and at a time when the first stage 1 has ascertained the most significant digit of the input voltage, a gating pulse 23 is applied along gating line 15 to the second stage 2. During the pendency of the pulse 23 and at a time when the second stage has ascertained the second most significant digit of the input voltage, a gating pulse 24 is applied to the third stage along gating line 17. When the devices 1B, 2B and 3B have been set up, a transfer pulse 25 is applied along line 18 and the number represented by the condition of the bistable devices 1B, 2B and 3B is read into some other piece of equipment, e.g. a core store. The pulse cycle may then be repeated. Each pulse cycle may occupy as little as 1$\mu$ sec. so that the analogue-digital converter is capable of high speed operation. It may be used continuously to sample a single input voltage applied to line 4 or the line 4 may be switched sequentially to different input voltages.

It will be appreciated that as the converter operates by comparison of voltages rather than currents and that as no switching of reference values is required, the converter is capable of operating at high speeds with accuracy. The converter described uses a large measure of parallel operation so that the number of switching actions or delays inherent in conventional analogue to digital converters is materially reduced.

It will be understood that where reference is made to a voltage being greater or less than another this is taken to be with respect to zero volt. Thus, for example −10 v. is considered to be greater than −9 v. just as 10 v. is considered greater than 9 v. Effectively, the sign is ignored.

It will also be understood that although the stages 1, 2 and 3 have been described as operating on the decimal system they may be made to operate in any other numerical system by selecting an appropriate number of amplifiers and AND gates and corresponding reference voltage.

I claim:

1. An analogue-digital converter comprising a plurality of stages each representing a plurality of digits in a numerical system and connected in series in decreasing order of significance, a separate subtracting device connected between each stage and the next stage in the series, means applying to each stage a set of reference voltages representing by their magnitudes the digits in the numerical system and the order of significance of the stage, comparison means in each stage operable simultaneously to compare an input voltage applied to the stage with the set of reference voltages applied to the stage to derive an output signal from each stage representing that one reference voltage in the set of reference voltages applied to the stage which is not greater than the input voltage to the stage and represents the digit immediately below that digit corresponding to a reference voltage in the set which is greater than the input voltage to the stage, separate digitising means associated with each stage and responsive to the output signal of the associated stage to assume a condition representing in digital form said one reference voltage of the associated stage, means for applying the input voltage to each stage to the subtracting device connected between that stage and the next stage in the series, means associated with each stage, except the last stage in the series, and responsive to the output signal of the associated stage to apply said one reference voltage of the associated stage to the subtracting device connected between the associated stage in the series and the next stage to derive a difference voltage representing the difference between the input voltage to the associated stage and said one reference voltage of the associated stage, means for applying the voltage to be digitised to the first stage in the series as the input thereto and means for applying to each succeeding stage in the series, as the input voltage to such succeeding stage, the difference voltage derived from the subtracting device connecting such succeeding stage to the immediately preceding stage.

2. An analogue-digital converter according to claim 1 wherein said numerical system is the decimal system and each set of reference voltages comprises nine voltages each representing a separate one of the digits 1 to 9.

3. An analogue-digital converter according to claim 1 wherein each digitising means is responsive to the output signal of the associated stage to assume a condition representing said one reference voltage of the associated stage in binary form.

4. An analogue-digital converter according to claim 3 wherein each digitising means is a four-stage bistable device.

5. An analogue-digital converter according to claim 1 including gating means associated with each stage and means for generating and applying a separate gating pulse to the gating means of each stage to pass the output signal of that stage to the associated digitising means, the gating pulse applied to each stage occurring during the pendency and after the commencement of the gating pulse applied to the immediately preceding stage in the series.

References Cited

UNITED STATES PATENTS

| | | | |
|---|---|---|---|
| 2,832,827 | 4/1958 | Metzger | 340—347 |
| 3,072,332 | 1/1963 | Margopoulos | 340—347 |
| 3,221,324 | 11/1965 | Margopoulos | 340—347 |

MAYNARD R. WILBUR, *Primary Examiner.*

J. GLASSMAN, *Assistant Examiner.*